W. O. Reim.
Hydrostatic Scales.
Nº 62,366. Patented Feb. 26, 1867.

Fig. A.

Witnesses.
F. Blauvelt
Lawrence Murphy

Inventor.
Wm O Reim
D. P. Holloway & Co
his Attys

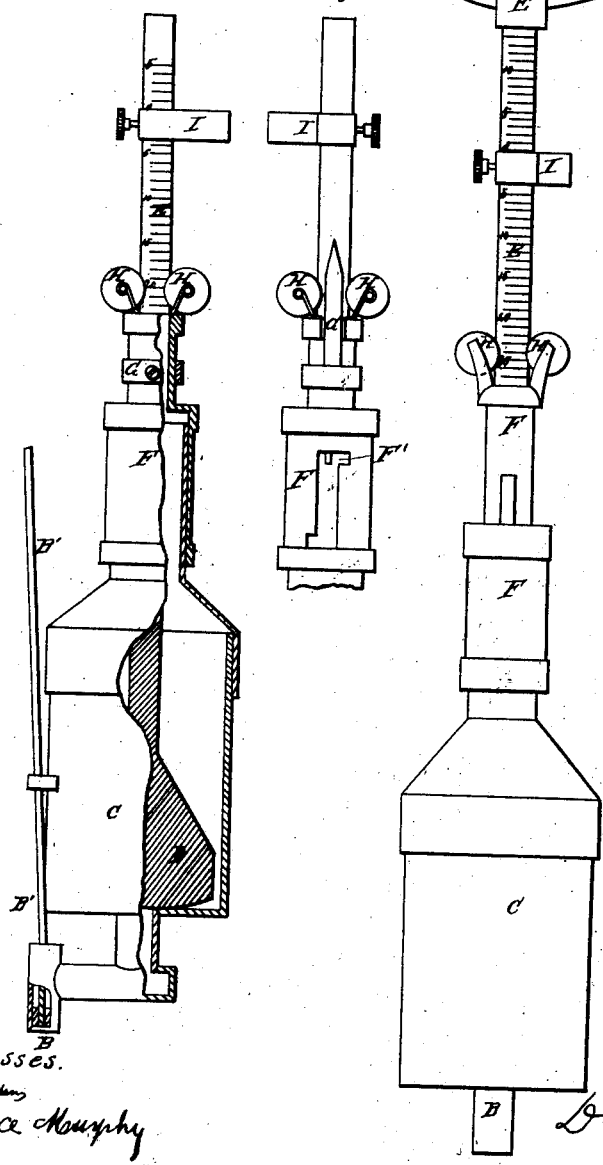

United States Patent Office.

WILLIAM OSCAR REIM, OF SPRINGFIELD, OHIO.

*Letters Patent No. 62,366, dated February 26, 1867.*

APPARATUS FOR ASCERTAINING TONNAGE, &c.

*The Schedule referred to in these Letters Patent and making part of the same.*

TO ALL WHOM IT MAY CONCERN:

Be it known that I, WILLIAM OSCAR REIM, of Springfield, in the county of Clark, and State of Ohio, have invented new and useful Improvements in Apparatus for Measuring the Tonnage of Vessels and in the mode of applying the same; and I do hereby declare that the following is a full, clear, and exact description of the same, reference being had to the annexed drawings, making part of this specification, in which—

Figure 1 is a perspective view showing the apparatus applied to a symmetrical hull in which the sections formed by cutting it centrally fore and aft or abeam would be similar.

Figure 2 is a side elevation of my improved hydrostatic scale, represented with portions of the casing as broken away to show the interior parts.

Figure 3 is a side elevation showing parts of the same.

Figure 4 is a side elevation showing a variation in the construction of the same; and Figure A is a diagram referred to in the specification and therein explained.

Figure 1:
Figure 1:
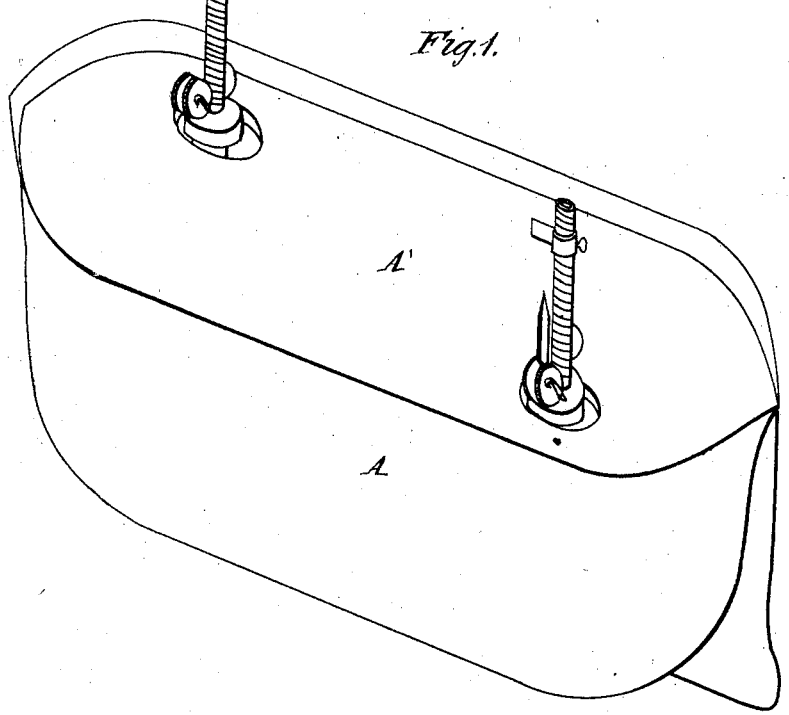

The same letters are employed in all the figures in the indication of parts which are identical.

My improvement consists in the use of duplex scales, placed on opposite sides and ends of the vessel, for the admeasurement of the displacement and the determination of the total result by the average of all. Also in determining the best position for placing the scales. Also in sundry improvements, to be hereinafter set forth, upon the construction of such scales. It has been heretofore attempted to measure the displacement of vessels by a single scale placed at what is called the dead-point. Such was the purpose of Amory Amsden's patent, (of which I am sole owner by mesne assignment,) which in practice has proved a failure by reason of its inability to detect the change of form always attending the unequal loading of vessels, which is technically called "hogging." To guard against this imperfection in the indication of results, I use a duplex system of scales placed on opposite sides and ends of the vessel, by the average measurement of which the correct result may at all times be obtained. Two scales thus placed will answer for ordinary vessels; in very large ones it may be necessary to increase the number by some multiple of two. I have ascertained by experiment that the best point for locating the scales is not at the dead-point, as recommended by Amsden, but to place one on each side of the kelson at a point midway between the dead-point and the bow and stern respectively. To insure the most perfect action and the greatest convenience in use, the hull should be formed alike at both ends, so that a section made in the centre, longitudinally or transversely, would separate into two equal and similar parts. I do not limit my claim, however, to any particular form of vessel, but include its application alike to all.

To enable others skilled in the art to construct and apply my apparatus, I will proceed more particularly to describe it.

A is the hull of a vessel, which should be, as already stated, of correspondingly symmetrical form at each end; but whether so or not, the form and size must be determined by accurate external measurements. The form of the scales is shown in figs. 2 and 3. They are placed according to the rule hereinbefore explained; the stems rising through the deck A', and the vertical extremity of the tube passing through the hull and opening into the water under the vessel. A horizontal elbow enters the tube B, near the middle thereof. The tube is closed by tightly fitting plunger valve, moved by the rod B'. This valve being raised above the elbow the water will flow into the chamber C. The valve may be pressed down until opposite the mouth of the elbow, which it is long enough to close, or being pressed below the elbow will prevent the entrance of the water from the outside, and at the same time allow the water in the cylinder to escape over the tube B into the bilge water in the bottom of the vessel. The diameter of the tube should be large enough to permit a free communication between the water outside and the cylinder, and at the same time not large enough to permit sudden and violent action in the float D. The float D is a water-tight hollow bulb, made of non-corrosive metal, supporting the stem E. F is an adjustable collar sliding vertically upon the neck of the cylinder, and held in position by a pin, F', passing through a Z-formed slot in said collar, by means of which collar the mechanism thereto attached may be raised above or carried below deck. To this sliding collar is attached the index G, adjustably attached to the collar F, by a set-screw, and also the friction-pulleys H, with grooved faces, between which the stem E rises and falls with the action of the float. The stem E is graduated into fractions of feet upwards, and downwards from a zero mark, to which the index should be set before the vessel is loaded. The arm I is adjustably attached to the stem E by a set-screw, and is intended, when the float is raised by water entering the boat or vessel, by means of a leak in the hull, or illegal freight, to start appropriate mechanism for the purpose of giving an alarm. In fig. 4 I have shown the proper construction of a single scale to be placed at the "dead-point" in the vessel. On the upper end of the stem is an indicator, H, with extending arms, and balanced upon a sharp edge so as always to maintain its horizontal position, the degree of deflection fore and aft or abeam being shown upon a graduated arc to which the indicator arms point. The indicator turns with the revolving head E'.

The mode of operating with this apparatus is as follows, viz: The adjustable collar F being raised above the deck, the index G should be set to point to the zero mark. As the cargo is loaded the vessel will sink in the water and the float and graduated stem will rise. The amount of this change as ascertained by the average of the scale, will determine the line where the plane of displacement will cut the hull; the distance from the zero mark to the point of the index will enable the operator to determine the plane of original displacement, and these two planes mark the ends of the frustum of the hull, the cubical contents of which in feet, multiplied by the weight of a cubic foot of water, (which, as not being a fixed quantity, should be ascertained, though $62\tfrac{5}{10}$ may be accepted as the ordinary rule,) will give the exact weight of the cargo taken on board.

What I claim as my invention, and desire to secure by Letters Patent, is—

1. The use of a duplex system of hydrostatic scales for the admeasurement of the displacement of vessels, when said scales are respectively placed in relation to the vessel and one another substantially as set forth.

2. The combination of the cylinder C, pipe B, and plunger valve actuated by the rod B', when arranged to operate substantially as and for the purpose set forth.

3. In combination with the cylinder C, float D, and graduated stem E, I claim the revolving head E', and balanced indicator H, substantially as and for the purpose set forth.

WILLIAM OSCAR REIM.

Witnesses:
REUBEN MILLER,
S. D. CARPENTER.